United States Patent
Ray

(10) Patent No.: US 6,286,815 B1
(45) Date of Patent: Sep. 11, 2001

(54) WIRE PULLER

(76) Inventor: Brian N. Ray, 1749 S. Glenview Dr., Mesa, AZ (US) 85204

( * ) Notice: Subject to any disclaimer, the term of this patent is extended or adjusted under 35 U.S.C. 154(b) by 0 days.

(21) Appl. No.: 09/441,023

(22) Filed: Nov. 16, 1999

Related U.S. Application Data

(63) Continuation-in-part of application No. 09/079,541, filed on May 15, 1998, now Pat. No. 5,984,273.

(51) Int. Cl.$^7$ .................................................. E21C 29/16
(52) U.S. Cl. ..................................................... 254/134.3 R
(58) Field of Search ................................ 242/390.8, 250, 242/916; 173/36, 170; 408/712, 241 R; 254/139.3 FT, 134.3 PA, 134.3 R

(56) References Cited

U.S. PATENT DOCUMENTS

| | | |
|---|---|---|
| 2,489,319 | 11/1949 | Nave et al. . |
| 3,185,399 | 5/1965 | Pellicciotti . |
| 3,190,616 | 6/1965 | Oleson . |
| 3,610,582 | 10/1971 | Passoni . |
| 3,968,952 | 7/1976 | Newell . |
| 3,985,188 | 10/1976 | Steele . |
| 4,196,864 | 4/1980 | Cole . |
| 4,270,734 | 6/1981 | Straight . |
| 4,290,584 | 9/1981 | Eckels et al. . |
| 4,456,225 | 6/1984 | Lucas . |
| 4,497,470 | 2/1985 | Carter et al. . |
| 4,951,890 | 8/1990 | Sossamon . |
| 4,956,889 | 9/1990 | Kirk . |
| 5,149,056 | 9/1992 | Jones . |
| 5,277,350 | 1/1994 | Thornbury, Jr. . |
| 5,322,397 | 6/1994 | Spear . |
| 5,376,035 | 12/1994 | Forrest . |
| 5,509,489 | 4/1996 | Lower, Jr. . |
| 5,820,317 | 10/1998 | Van Troba . |
| 5,863,160 | 1/1999 | Havener . |
| 5,885,036 | 3/1999 | Wheeler . |

Primary Examiner—Robert C. Watson
(74) Attorney, Agent, or Firm—Schmeiser, Olsen & Watts

(57) ABSTRACT

An apparatus includes a frame having a drive shaft mounting portion and a power tool restraint portion, wherein the power tool restraint portion is adapted to register a portable rotary power tool, such as a power drill, with the frame. A drive shaft is mounted with the frame in the drive shaft mounting portion, wherein the drive shaft may be rotated about its longitudinal axis and a first end of the drive shaft is sized to be coupled with a rotary output of the power tool. A frame switch having an "off" position and an "on" position is also mounted on the frame, the frame switch engaging a power switch on the power tool when the frame switch is moved from the "off" position to the "on" position and when such a tool is mounted in the restraint portion and coupled to the drive shaft.

22 Claims, 7 Drawing Sheets

WIRE PULLER

RELATED APPLICATION

This application is a continuation-in-part of the earlier patent application by Brian N. Ray entitled "WIRE PULLER", Ser. No. 09/079,541, filed May 15, 1998 now U.S. Pat. No. 5,984,273, which is incorporated herein by reference.

BACKGROUND OF THE INVENTION

1. Technical Field

This invention relates to the field of an apparatus for applying pulling force. More specifically the invention relates to an apparatus for placement of conductive wire.

2. Background Art

Supplying buildings with electricity and communications involves threading lines, or cable, through conduit. Typically, the path that cable must travel through conduit includes changes in elevation and turns around corners. Generally, the procedure used to run cable involves first threading lightweight flexible lines through the entire length of conduit. Heavier lines are then pulled through, by attaching them to one end of the lighter line and pulling the lighter line through at the other end of the conduit. This procedure may need to be repeated until a line is threaded which can bear the weight of the target cable, when is then attached and pulled through.

To thread heavier lines, lighter lines must be pulled through first. The pulling force required can be significant depending on the weight of the heavier lines and distance traveled. The pulling force can also increase with the bends and turns in the conduit. Thus, there is a need to substitute machine force for human force to reduce the human effort required in this procedure.

Others have substituted machine force for human force in pulling cable through conduit. Oleson, U.S. Pat. No. 3,190,616, discloses a cable threading apparatus. Newell, U.S. Pat. No. 3,968,952, discloses an assembly for pulling a line. Straight, U.S. Pat. No. 4,270,734, discloses a portable wire puller. Lucas, U.S. Pat. No. 4,456,225 discloses a cable pulling apparatus. Carter et al., U.S. Pat. No. 4,497,470, discloses a powered cart mounted cable puller.

Each of the named apparatus includes a dedicated motor; however, dedicating a motor in most cases adds bulk, weight, and cost. Therefore, the need to substitute machine force for human force in pulling wire without significant bulk, weight, and cost is not met by these apparatus.

Others have applied the use of hand-held power drills for winding. Cole, U.S. Pat. No. 4,196,864 discloses a line winding tool set. Sossamon, U.S. Pat. No. 4,951,890 discloses a drill-operated adapter for unwinding fishing lines from reels. Jones, U.S. Pat. No. 5,149,056 discloses a wire puller for electrical conduits.

These apparatus attach to a power drill, utilizing the power of the drill to pull cable and wind it onto various sized and shaped spindles. However, they are often insufficient for use with the various weights and lengths of cable threaded through conduit. Further, these apparatus share a problem, in that an operator must exert differing degrees of stabilizing force to hold the drill during the winding process. In summary, the prior art apparatus have proven to be cumbersome, and to be very limited in the capacity of line that may be wound onto their spindles.

DISCLOSURE OF INVENTION

Thus, it can be seen from the above discussion that it would be an improvement in the art to provide a line puller which can be driven by a multiple use motor so that the weight and cost of the apparatus is minimized. Also it would be an improvement if the line puller could be positioned such that the operator does not have to exert a stabilizing force while the wire is pulled, and is not limited in line winding capacity.

According to the present invention, an apparatus for pulling line through conduit is disclosed, to which a power drill or other portable power tool may be attached as the motor force. The apparatus includes a frame having a drive shaft mounting portion and a power tool restraint portion, wherein the power tool restraint portion is adapted to register a portable rotary power tool, such as a power drill, with the frame. A drive shaft is mounted with the frame in the drive shaft mounting portion, wherein the drive shaft may be rotated about its longitudinal axis and a first end of the drive shaft is sized to be coupled with a rotary output of the power tool. A frame switch having an "off" position and an "on" position is also mounted on the frame, the frame switch engaging a power switch on the power tool when the frame switch is moved from the "off" position to the "on" position and when such a tool is mounted in the restraint portion and coupled to the drive shaft. The stand and frame can be disassembled for easy transport.

The wire pulling apparatus is located near a conduit opening, or junction box, through which the line is to be pulled. The power tool is positioned onto the wire pulling apparatus. For example, if the power tool is a power drill it is positioned such that the jaws of the drill fit around one end of the drive shaft, and such that the frame switch can be used to depress the trigger switch on the drill. The chuck of the drill is used to couple the drill jaws to the drive shaft. The drill switch lever of the frame switch is rotated to actuate the drill that turns the drive shaft. The line to be pulled is then wrapped at least once around a spool attached to the drive shaft and maintained taut by the wire puller operator, to allow the turning of the drive shaft to pull the line through the conduit and out of the junction box.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

BEST MODES FOR CARRYING OUT THE INVENTION

According to an embodiment of the present invention, a wire puller that utilizes the motor force of a standard right-angle power drill is disclosed. However, those skilled in the art will appreciate that any of several portable rotary power tools, such as power wrenches, can be used with the present invention. The wire puller can be operated by a single operator and disassembled to fit into a hand-held case. The hand-held case for the embodiment shown in FIGS. 1–3, measuring approximately 12 inches wide, by 21 inches long, by 7 inches high, facilitates transport of the wire puller to a location where line is to be pulled. A typical location at which line is pulled is a junction box at the end of a length of conduit. The wire puller is assembled in close proximity to the junction box.

Figure 1:
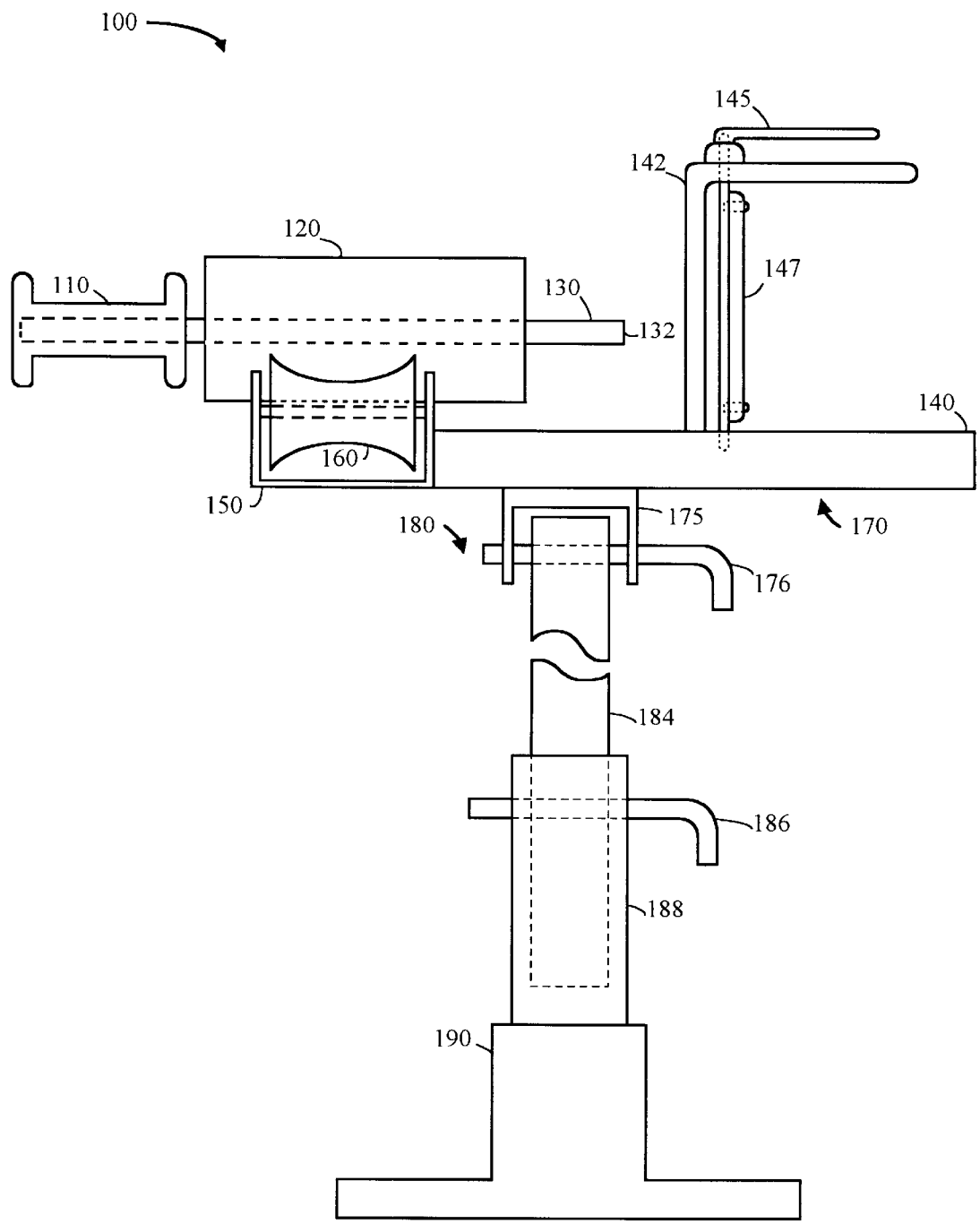
FIG. 1 is a side plan view of an embodiment of the present invention.
Figure 2:
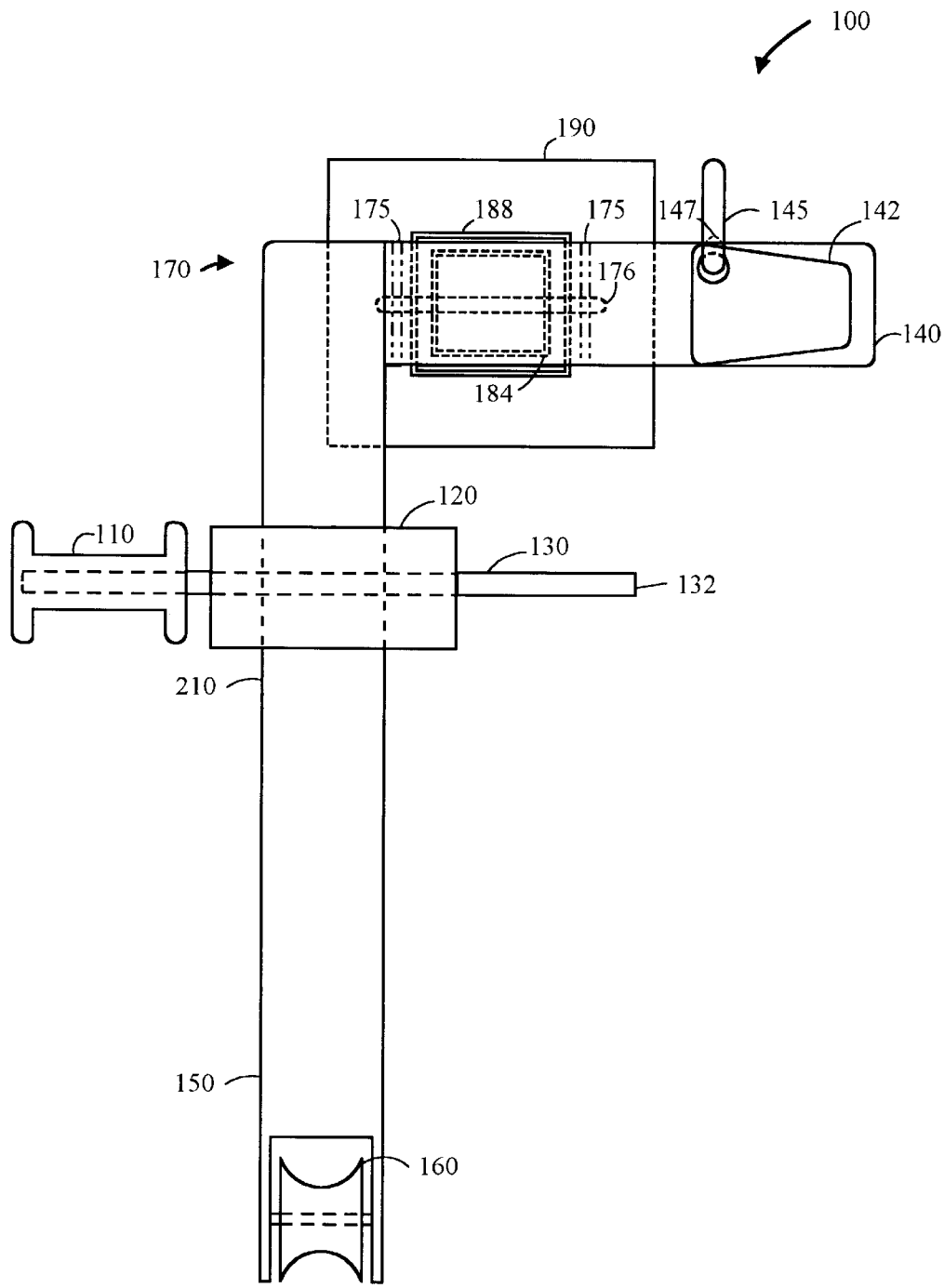
FIG. 2 is a top plan view of an embodiment of the present invention.
Figure 3:
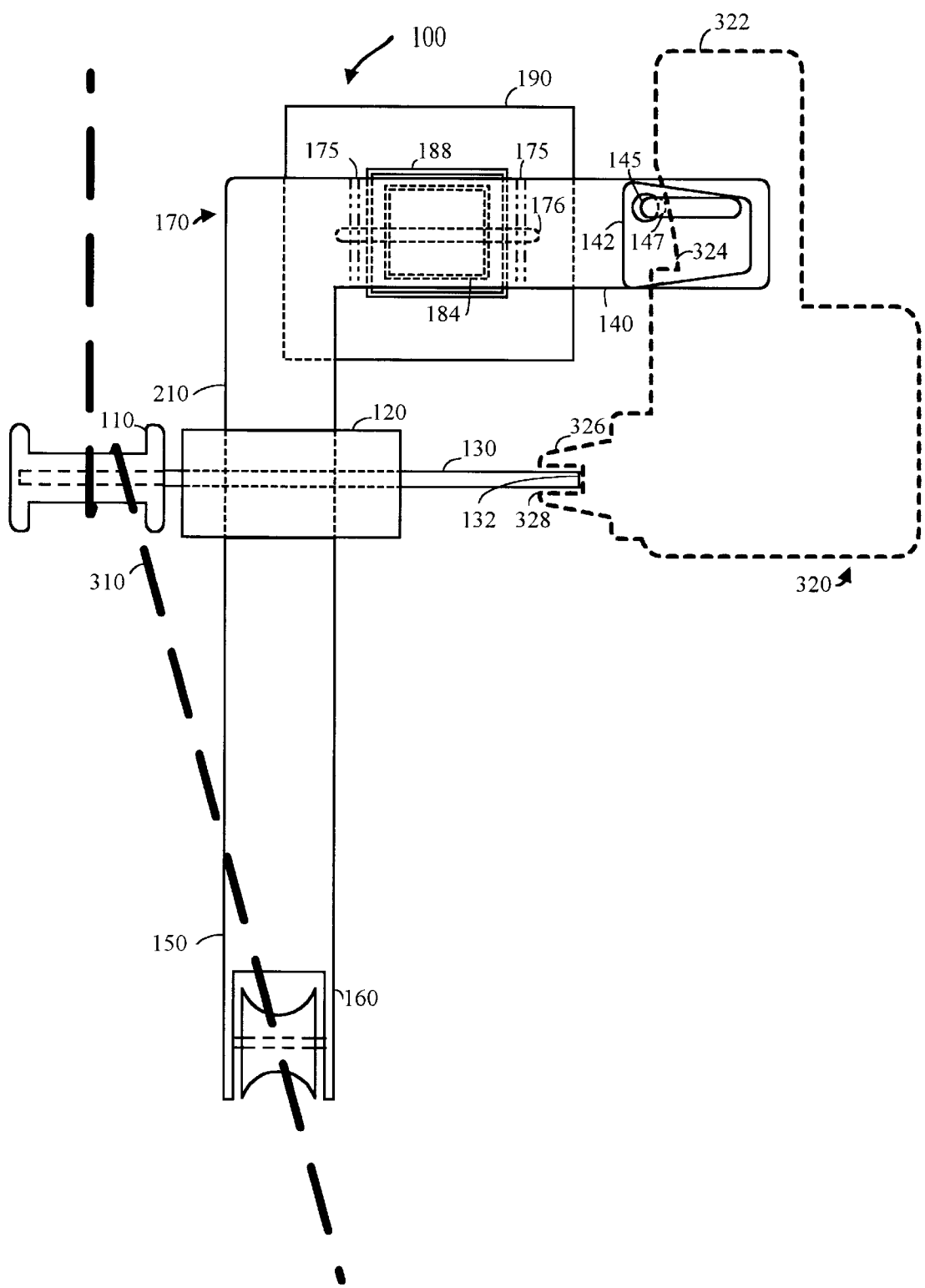
FIG. 3 is a top plan view depicting the operation of an embodiment of the present invention.

Assembly of the wire puller shown in FIGS. 1–3 includes the steps of attaching the wire puller frame to its stand, resting the forearm frame portion of the wire puller on the junction box opening, positioning the power drill such that one end of the wire puller drive shaft fits into the jaws of the drill, and such that the trigger switch of the power drill can be depressed by rotating the wire puller drill switch lever, and tightening the power drill chuck over the drive shaft. Thus, the only attachment of the power drill to the wire puller is the drill jaw to drive shaft coupling. This sole point of attachment allows the power drill to be easily detached from the wire puller, when needed for other drill uses.

Operating the assembled wire puller with attached power drill requires only a single operator. Operation does not require the wire puller operator to hold the power drill, because the attached drill is tightly coupled to the drive shaft and supported by the wire puller frame. Nor does operating the wire puller require the operator to depress the drill trigger switch to start and stop line pulling. Instead, the operator controls the starting and stopping of the line pulling by grasping and releasing a taut hold on the line.

To operate the wire puller, the operator first actuates the power drill, by rotating the drill switch lever on the wire puller. When the drill is actuated, the drive shaft and attached spool rotate. To pull line, the operator wraps the line to be pulled around the rotating spool, for at least one revolution. The wrapping creates a frictional coupling of the spool to the line, which allows the rotating spool to pull the line. As long as the wire puller operator keeps the line taut against the rotating spool, the wire puller pulls line. To stop pulling line, the wire puller operator need only relax the grip on the line, to stop the frictional coupling between the spool and the line. Thus, after initial actuation of the drill, line pulling can be started and stopped without starting and stopping the drill.

Thus, the disclosed wire puller is easy to transport, assemble, and operate. A standard right-angle drill fits easily onto the wire puller to provide the motor force to pull line. Only a single operator is needed to operate the wire puller. The operator need not hold the drill, nor control line pulling from the trigger switch on the drill. Instead, once the drill is actuated, the operator need only keep the line taut on the rotating spool to start line pulling, and relax the line to stop line pulling. And while the wire puller is not operational, the drill can easily be detached from the wire puller to serve other drill uses.

Referring now to FIG. 1, a side view of an embodiment of the present invention is depicted. Wire puller 100 includes a stand 180 and a frame 170. Stand 180 includes a base 190, a series of hollow square tubes 188 and 184, and a series of pins 176 and 186. Those skilled in the art will recognize that stand 180 can include any number of pieces which together stabilize frame assembly 170.

Base 190 rests on a floor, or surface, of the location where the line is to be pulled. The top of base 190 contains a sleeve, shaped to receive square tube 188. Square tube 188 is hollow to slidably receive square sleeve 184. Square sleeves 188 and 184 have a series of matched sets of holes on opposite sides. The holes are suitably sized and spaced to allow square sleeves 188 and 184 to be fastened together by pin 186 at differing heights. Those skilled in the art will recognize that a number of types of adjustable height mechanisms can be used in place of two hollow square sleeves fastened together with pins for this and other embodiments described herein.

Square sleeve 184 is attached to frame assembly 170 via pivot bracket 175 and pin 176. Sufficient clearance is necessary between square tube 184 and pivot bracket 175 to allow frame assembly 170 to rotate such that forearm frame portion 150 can tilt downward or upward from the top of square sleeve 184. Thus, attaching the stand to frame assembly 170 prevents movement of the frame assembly in any direction other than that of the pivot. Pin 176 is inserted through one side of pivot bracket 175, through square tube 184, and then through the second side of pivot bracket 175. Forearm frame portion 150 is configured to be able to rest on the edge of a junction box. In this manner, the wire puller stand provides one leg of horizontal support for frame assembly 170, and the junction box (not shown) provides a second leg of horizontal support.

Frame assembly 170 suitably includes a forearm frame portion 150, a drive shaft mounting frame portion 210 (shown in FIG. 2), and a drill restraint frame portion 140. Forearm frame portion 150 includes a narrow arm-like extension of frame assembly 170 and spool 160. The drive shaft mounting frame portion includes a drive shaft 130, a housing 120, and a spool 110. Drill restraint frame portion 140 includes a bracket 142 for holding a standard right-angle drill against frame assembly 170, and a frame switch including a drill switch lever 145 having a drill switch actuator 147. Although the frame switch preferably includes drill switch lever 145, the frame switch can be any of various other switch configurations, such as a sliding switch. Those skilled in the art will recognize that frame assembly 170 can take many shapes to serve the functions of the present invention. Those skilled in the art will also recognize that although drill restraint frame portion 140 has been adapted for a standard right-angle drill, drill restraint frame portion 140 can be adapted for various sizes and shapes of drills.

Spool 160 is mounted on the narrow arm-like extension of frame assembly 170. When positioned a short distance into the junction box, spool 160 facilitates the pulling of the line by guiding the line towards spool 110. For instance, conduit connecting to a junction box typically runs from a direction other than perpendicular to the opening of the junction box. By running the line over spool 160, the line is guided from the direction it travels through the conduit, towards spool 110, which is a direction more or less perpendicular to the opening of the junction box. Thus, spool 160 minimizes any friction created by the pulling of the line out from the junction box.

Drive shaft 130 is the sole attachment for the power drill, and rotates to effect the pulling of line. Drive shaft end 132 is sized to receive the jaws of the power drill. Drive shaft 130 runs through housing 120 which suitably contains bearings to facilitate the rotating of drive shaft 130 around its longitudinal axis. Housing 120 is mounted on frame assembly 170. Spool 110 is mounted on drive shaft 130, on the end opposite of drive shaft end 132, where the power drill attaches. When at least one revolution of line is placed around spool 110, the turning of drive shaft 130 pulls the line through the conduit.

Drill restraint frame portion 140 is designed to allow drill switch lever 145 to actuate the drill, when the drill has been coupled to drive shaft end 132. Bracket 142 is mounted on frame assembly 170. Bracket 142 serves to prevent the power drill from spinning around drive shaft 130 during actuation, when the jaws of the power drill are coupled with drive shaft end 132. Drill switch lever 145 is attached both to bracket 142 and frame assembly 170. Rotating drill switch lever 145 ninety degrees serves to depress the drill trigger and thus actuates the power drill, when the drill is coupled to drive shaft end 132 and held within bracket 142.

Referring now to FIG. 2, a top view of the assembled wire puller according to an embodiment of the present invention is depicted. The three portions of frame assembly 170 are all clearly visible, namely: forearm frame portion 150, drive shaft mounting frame portion 210, and drill restraint frame portion 140.

FIG. 2 shows how the narrow arm of frame assembly 170 extends outwardly and is suitable to be placed into a junction box. When forearm frame portion 150 is positioned to rest on the edge of a junction box, spool 160 serves to minimize any drag friction created by pulling the line out from the junction box towards spool 110.

FIG. 2 shows drill switch lever 145 in the "off" position, that is, the position in which drill switch actuator 147 will not actuate the power drill. The wire puller operator rotates drill switch lever 145 to rotate drill switch actuator 147 to actuate and to shut off the power drill, once the power drill is coupled to drive shaft end 132 and held between bracket 142 and frame assembly 170.

Referring now to FIG. 3, a top view according to an embodiment of the present invention is depicted. Power drill 320 is preferably a standard right-angle drill, and is positioned such that power drill jaws 328 receive drive shaft end 132. Power drill handle 322 fits between bracket 142 and frame assembly 170. Power drill chuck 326 tightens to couple power drill jaws 328 to drive shaft end 132. The drill jaw to drive shaft coupling is the only attachment of power drill 320 to the wire puller.

FIG. 3 shows the wire puller in operation. Drill switch lever 145 and drill switch actuator 147 are in the "on" position, thus depressing power drill trigger switch 324 and actuating power drill 320. Actuating power drill 320 rotates drive shaft 130 and spool 110. The wire puller operator wraps line 310 around spool 110 for at least one revolution. The wire puller operator then holds line 310 taut to establish frictional coupling between spool 160 and line 310. As the wire puller pulls line 320 out of the junction box, the wire puller operator accepts the feed to maintain the frictional coupling of line 320 and spool 110. The wire puller operates to pull line while the power drill is actuated and the line is frictionally coupled to spool 110. To cease pulling line 310, the operator need only release the grip on line 310 to stop the frictional coupling between spool 110 and line 310. Thus, line pulling can start and stop without the need to rotate drill switch lever 145, after initial actuation of power drill 320.

In summary, the wire puller apparatus is easily assembled from pieces which fit into a hand-held case, measuring approximately 12 inches wide, by 21 inches long, by 7 inches high. The wire puller is assembled and optimally positioned in close proximity to a junction box or other location, from which the line is to be pulled. Forearm frame portion 150 suitably rests on the edge of an electrical junction box. Spool 160 in forearm frame portion 150 extends into the junction box and serves to minimize the friction created by pulling the line out of the junction box.

Drive shaft end 132 is sized to be received within power drill jaws 328. Power drill 320 is positioned in drill restraint frame portion 140 to receive drive shaft end 132 and to allow drill switch lever 145 and drill switch actuator 147 to actuate power drill 320. Power drill chuck 326 couples power drill 320 to drive shaft end 132.

To operate the wire puller, the operator actuates power drill 320 by rotating drill switch lever 145. When power drill 320 is in operation, it turns drive shaft 130 and spool 110. The operator runs line 310 over spool 160, towards spool 110. The operator then wraps line 310 around spool 110 for at least one revolution, to establish a frictional coupling between spool 160 and line 310. As long as the operator maintains a taut hold of line 310, line 310 will be pulled out of the junction box. To cease pulling line 310 or reduce the speed with which the line is being pulled, the operator need only lessen the grip on line 310 to reduce or disengage the frictional coupling between spool 110 and line 310. Thus, line pulling can start and stop without the need to rotate drill switch lever 145, after initial actuation of power drill 320, and perhaps even more importantly, the tension on the line is infinitely variable and in complete control of the operator.

Figure 4:
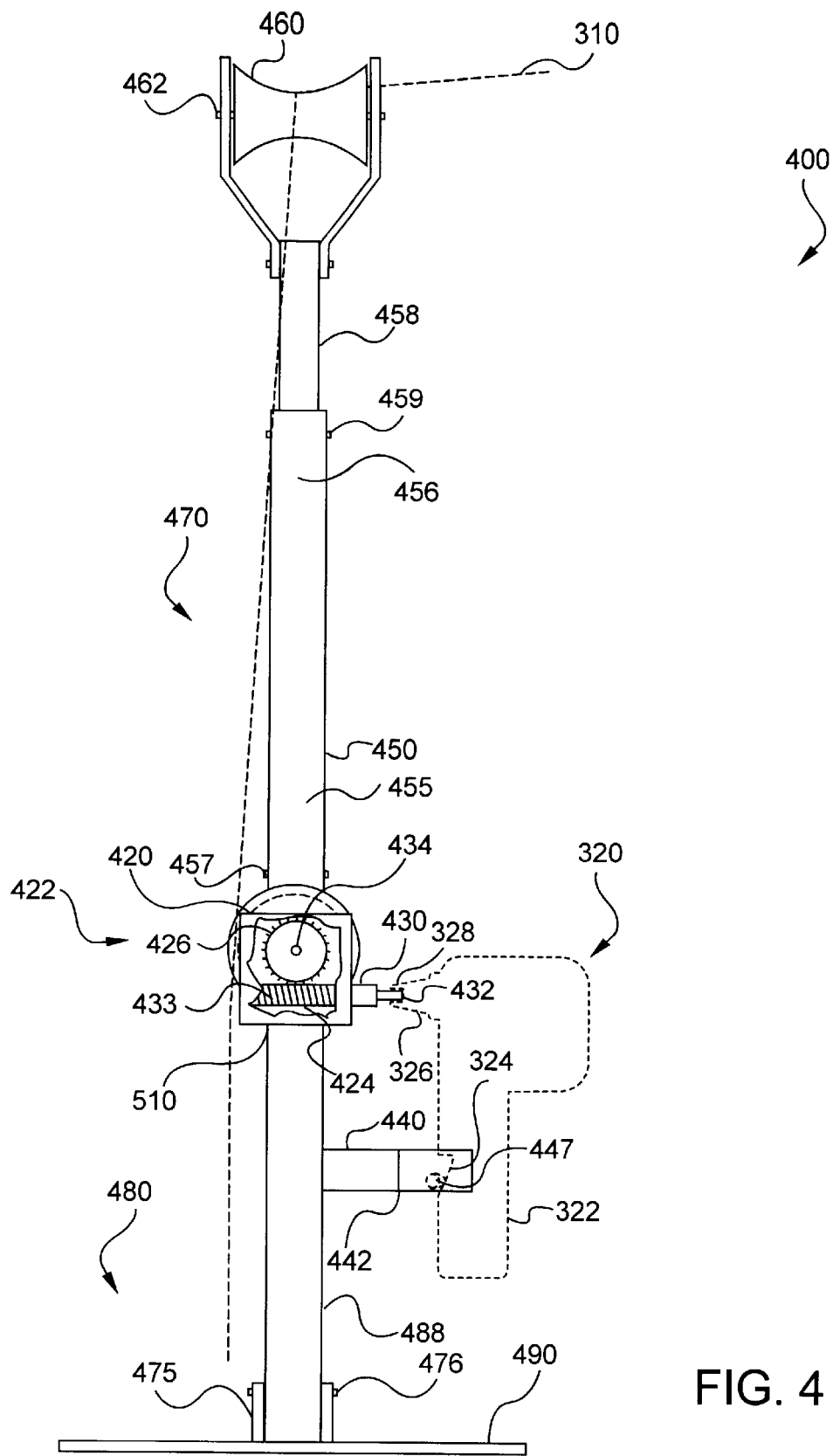
FIG. 4 is a partially broken away front plan view of a wire puller according to the present invention.
Figure 5:
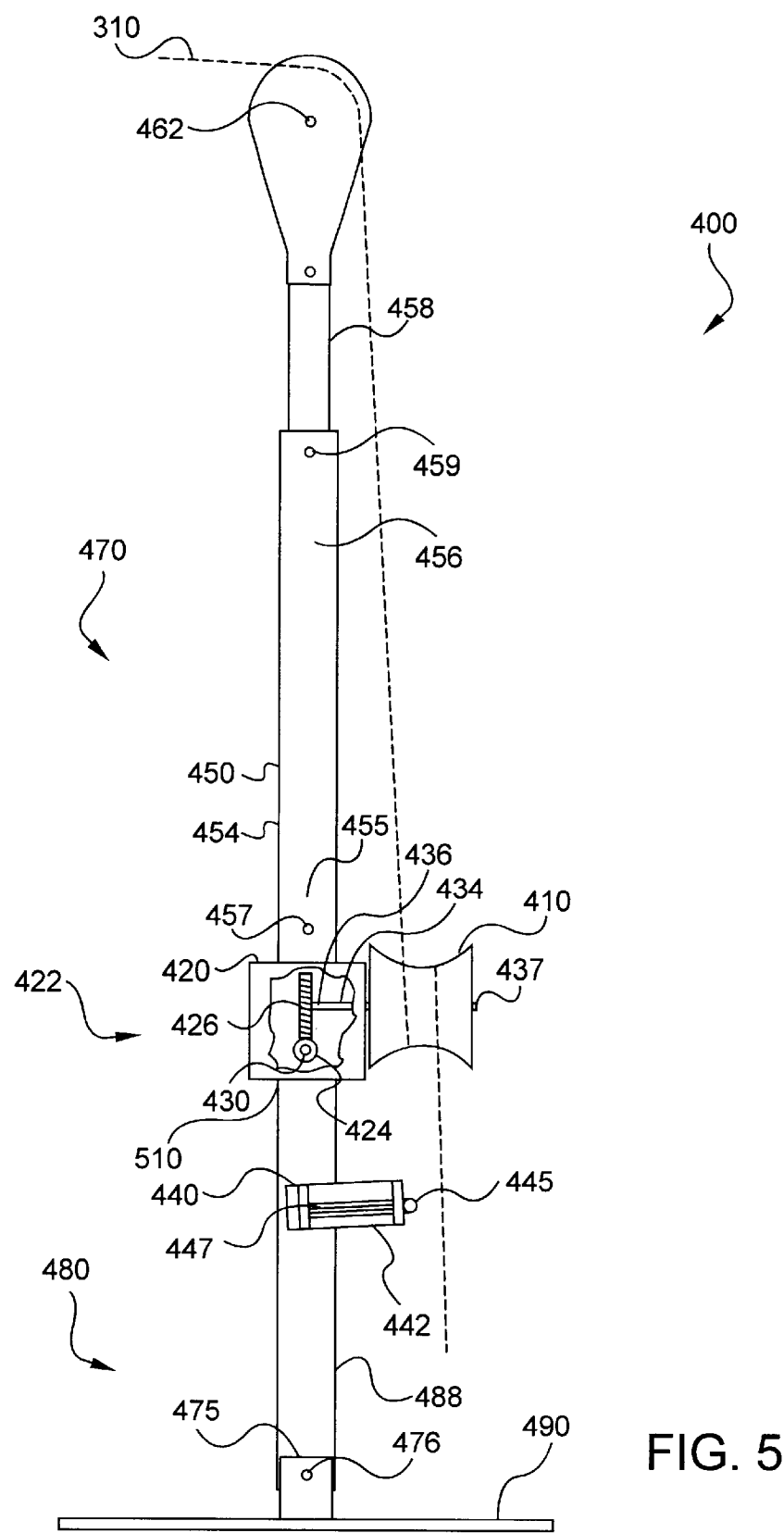
FIG. 5 is a partially broken away side plan view of the wire puller of FIG. 4.

Referring now to FIGS. 4–5, in an alternative embodiment of the present invention, wire puller 400 includes a frame 470 and a stand 480 that supports frame 470. Stand 480 includes a base 490, a bracket 475 fixed to base 490, and a square tube 488 that is pivotally connected within bracket 475 by a pin 476 that extends through holes in opposing sides of bracket 475 and through holes in opposing sides of tube 488. The pivotal connection formed by pin 476 allows the entire wire puller 400 (excluding base 490) to pivot relative to base 490.

Frame 470 includes a drill restraint portion 440 that extends from square tube 488 to form a bracket 442. Bracket 442 receives handle 322 of power drill 320 so as to register power drill 320 with frame 470. Bracket 442 may be sized differently and may be positioned differently with respect to square tubing 488 to accommodate different models and types of power tools.

In the embodiment shown, a frame switch that includes a switch lever 445, which includes an eccentric switch actuator 447 is attached to drill restraint portion 440. Switch lever 445 pivots between an "on" position wherein it engages a power switch or trigger switch 324 of power drill 320 (as shown in FIG. 4) and an "off" position where it does not engage trigger switch 324. In the embodiment shown, in the "on" position switch actuator 447 pivots into engagement with trigger switch 324 when switch lever 445 is pivoted and continuously remains in that position until a user pivots it back into the "off" position. However, the frame switch could be some type of switch that does not include switch lever 445, such as a sliding switch, so long as it is easily moved from the "on" position to the "off" position and it remains in the "on" position without constant force from a user.

Square tube 488 is preferably secured to a housing 420 to form a drive shaft mounting frame portion 510 of frame 470. Tube 488 may be secured to housing 420 by welding or by any of many other well known methods, such as by bolts or screws. In this embodiment, housing 420 houses a transmission 422. Transmission 422 includes a drive shaft or input shaft 430 and an output shaft 434. Input shaft 430 includes an end 432 that is sized to mate with jaws 328 of chuck 326 of power drill 320. If some other type of power tool, such as an air wrench were used with wire puller 400, end 432 would be sized and shaped in a manner so that it could be coupled with the rotary output of that power tool.

Transmission 422 preferably is such that the rotational speed of output shaft 434 is less than the rotational speed of input shaft 430. Also, transmission 422 is preferably as light, durable, strong, and compact as possible. In the embodiment shown, transmission 422 also includes a worm gear 424 that is fixed to an end 433 of input shaft 430 opposite from end 432. Worm gear 424 preferably engages a helical gear 426. Helical gear 426 is fixed to an end 436 of output shaft 434. A spool 410 is mounted on an end 437 of output shaft 434 opposite from end 436. Thus transmission 422 transmits torque from input shaft 430 to output shaft 434, and reduces the rotational speed so that the torque of output shaft 434 is greater than the torque of input shaft 430. Preferably, in this embodiment the ratio of the rotational speed of input shaft 430 to the rotational speed of output shaft 434 is 10:1. Those skilled in the art will appreciate that well-known gears, bearing systems, and gear attachment systems may be used in transmission 422 as described herein.

Depending on the desired output torque and the input torque of power drill 320, the desired ratio may be different. A greater ratio would be desirable if the input torque of power drill 320 were less or if the necessary torque for pulling wire were greater. In fact, it may even be desirable in some situations to have the rotational speed of output shaft 434 exceed the rotational speed of input shaft 430. The worm gear-spur gear configuration used in this embodiment is light, compact, durable and strong. However, other types and configurations of transmissions could be used. For example, a planetary gear system might be desirable to produce ratios that are far in excess of the 10:1 ratio in the embodiment described herein. Alternatively, a system of chains or belts may be used.

Forearm frame portion 450 extends from, and is fixed to housing 420. More particularly, a square tube (not shown) is fixed to housing 420 and extends opposite from square tube 488. A square tube 454 has a first end 455 and an opposing second end 456. First end 455 slides over the square tube that is fixed to housing 420. A pin 457 extends through aligning holes in opposing sides of the square tubes to fix square tube 454 to the square tube that is fixed to housing 420. Second end 456 receives a square tube 458, and a pin 459 extends through aligning holes in second end 456 and square tube 458 to fix square tube 454 to square tube 458. Preferably square tube 458 has multiple holes along its length so that it can be slid to any of multiple positions, thereby adjusting the length of forearm portion 450.

A spool 460 is attached to an end of square tube 458 opposite from its attachment with square tube 454. Thus, by adjusting the length of forearm portion 450 as described above, the position of spool 460 relative to base 490 and the distance between spool 460 and spool 410 is adjusted. Such adjustment is advantageous to allow wire puller 400 to be used in various different environments where lines need to be pulled.

Figure 6:
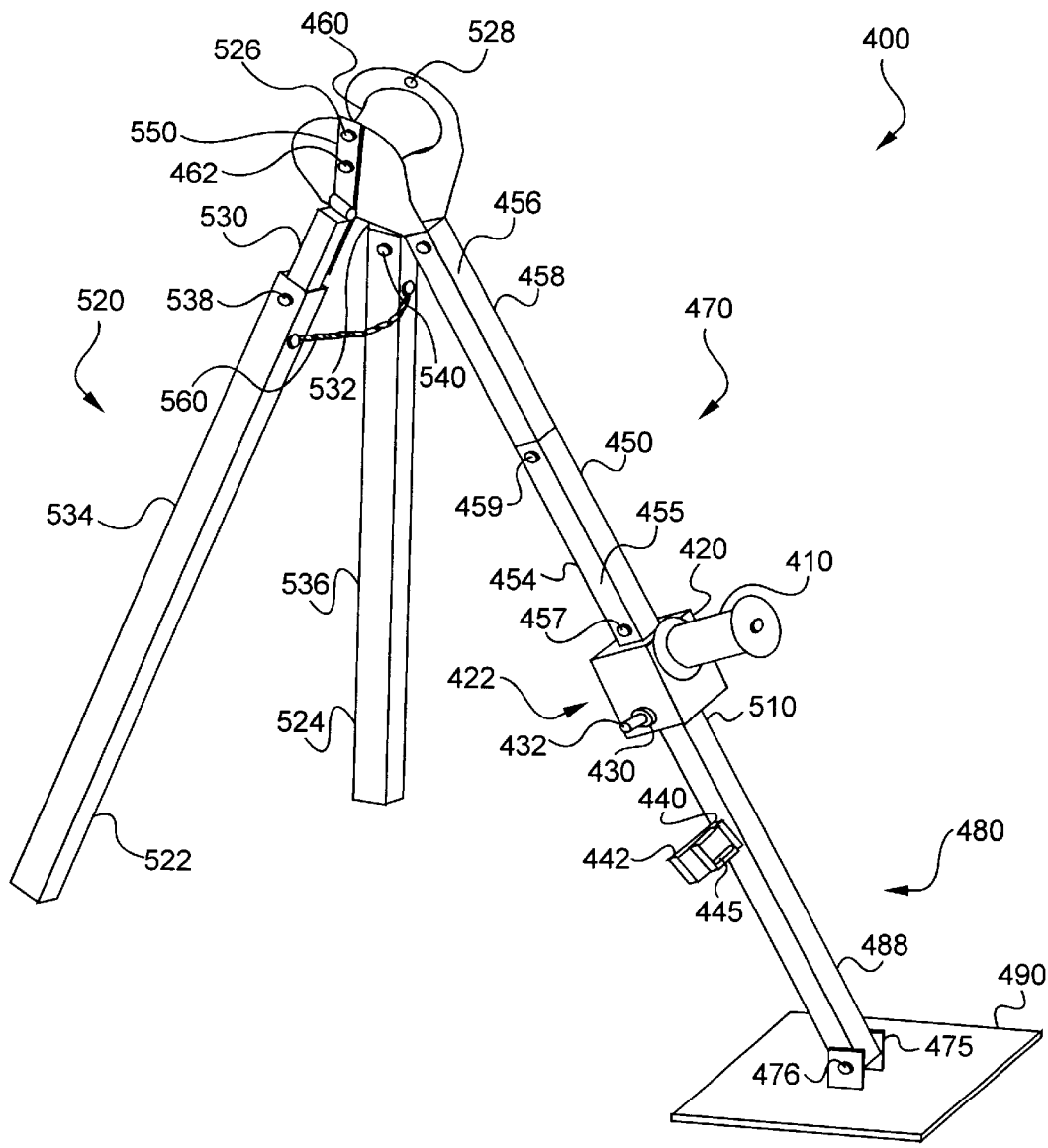
FIG. 6 is an isometric view of the wire puller of FIG. 4 including a stand for supporting the forearm portion of the frame.

Wire puller 400 preferably includes a support to prevent wire puller 410 from rotating about pin 476 and to fix spool 460 at a height. Referring to FIG. 6, the support can be a stand 520 that includes a pair of legs 522, 524. Each leg 522, 524 is attached to forearm portion 450. Preferably, legs 522, 524 are attached to opposing sides of spool 460 by a pin 462 that also supports spool 460 within forearm portion 450. Pin 462 extends through a hole in leg 522, through opposing holes in forearm portion 450, through spool 460, and through a hole in leg 524. An additional bolt or pin 526 extends through a hole in leg 522 and an aligned hole in forearm portion 450 to prevent leg 522 from freely pivoting about pin 462. Likewise, a bolt or pin 528 extends through a hole in leg 524 and an aligned hole in forearm portion 450 to prevent leg 524 from freely pivoting about pin 462.

Each leg 522, 524 includes a square tube 530, 532 that extends away from forearm portion 450, and a slightly larger square tube 534, 536 that extends from square tube 530, 532, respectively. Square tube 534 slides over square tube 530 and a pin 538 extends through opposing holes in square tube 530 and square tube 534 to secure tubes 530 and 534 together. Square tube 536 slides over square tube 532 and a pin 540 extends through opposing holes in square tube 532 and square tube 536 to secure tubes 532 and 536 together. Tubes 534, 536 and/or tubes 530, 532 may each include multiple holes so that the tubes can be adjusted relative to each other to adjust the overall length of legs 522, 524.

Legs 522, 524 preferably each include a hinge 550 (hinge for leg 524 not shown) that allows the leg to pivot so that it will slope downwardly and outwardly. However, the outward slope of legs 522, 524 is constrained by a chain 560 that extends between legs 522, 524. Although stand 520 has been described herein with particularity, those skilled in the art will understand that any of several other configurations for the stand are possible. For example, the legs 522, 524 could be fixed at a definite outward slope rather than being pivotally attached by hinges 550.

Figure 7:
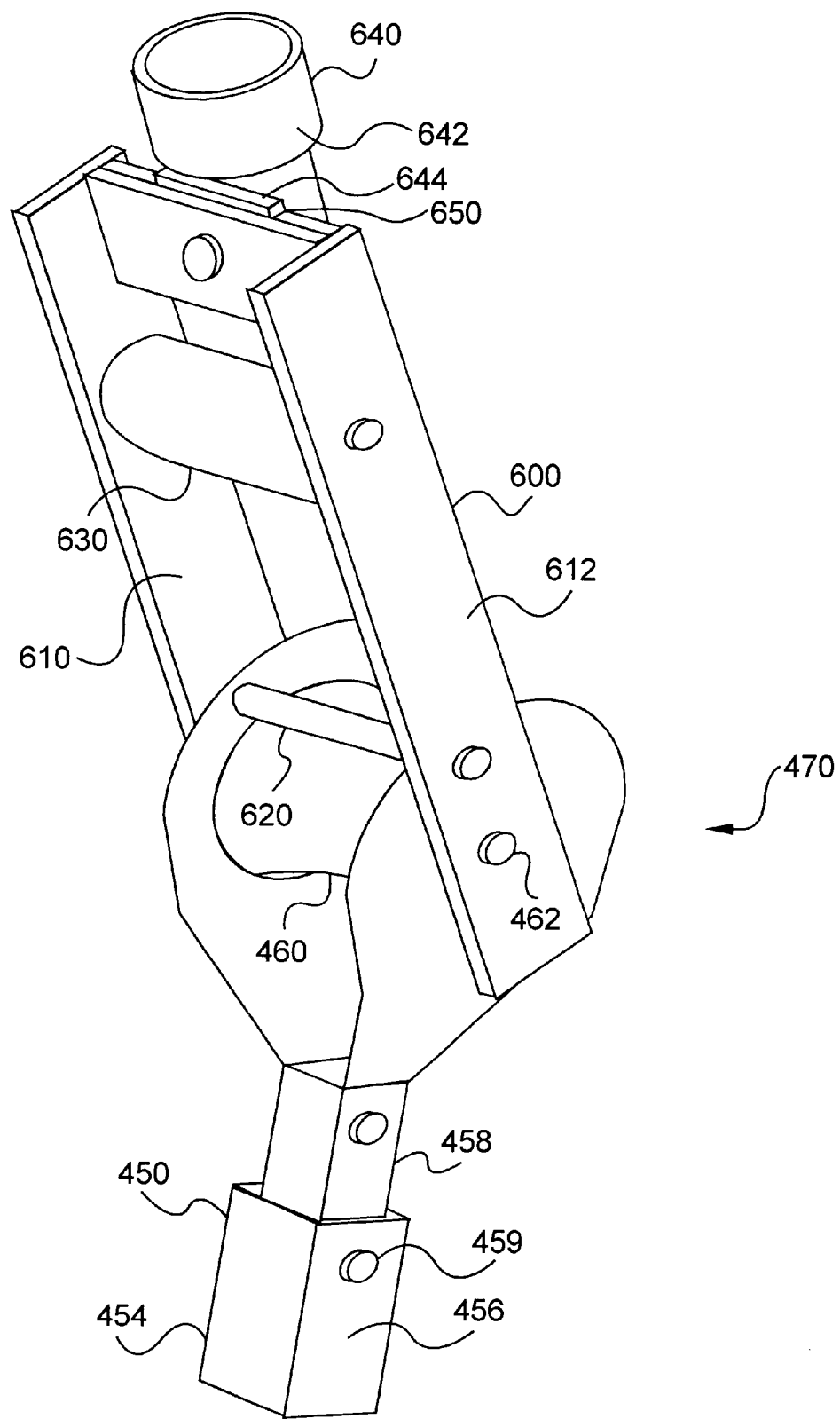
FIG. 7 is an isometric view of a mounting bracket attached to the wire puller of FIG. 4.

Referring to FIG. 7, alternatively, the support may be a mounting bracket 600. Mounting bracket 600 includes arms 610, 612 that attach to forearm portion 450, and form an extension of forearm portion 450. Preferably, arms 610, 612 define holes that receive pin 462 on opposing sides of spool 460. A pin 620 extends through holes in opposing sides of forearm portion 450 and through holes in arms 610, 612 to prevent bracket 600 from freely pivoting about pin 462. Preferably, arms 610, 612 also support a spool 630 therebetween. When in use with mounting bracket 600, a line is preferably guided by spool 630, rather than spool 460.

An adapter 640 is adapted to be secured to an opening of a conduit from which wire is being pulled, and is preferably attached to bracket 600. Adapter 640 includes a threaded tube 642 that engages a threaded end of a conduit. Adapter 640 also includes a tongue 644 fixed to tube 642 that slides into a slot 650 in bracket 600. A bolt then engages bracket 600 and tongue 644 to secure tongue 644 within slot 650 and thereby to fix adapter 640 to bracket 600. Bracket 600 keeps wire puller 400 from moving relative to an opening in a conduit from which wire is being pulled, whether the conduit is above ground or below ground.

Referring now to FIGS. 4–7, assembly of wire puller 400 includes the steps of attaching forearm portion 450 to housing 420, attaching either stand 520 or mounting bracket 600 to forearm portion 450, positioning power drill 320 such that end 432 of the wire puller drive shaft fits into jaws 328 of drill 320, and such that trigger switch 324 of power drill 320 can be depressed by rotating frame switch lever 445, and tightening power drill chuck 326 over drive shaft 430. Thus, the only attachment of the power drill to wire puller 400 is the drill jaw to drive shaft coupling. As described above, this sole point of attachment allows the power drill to be easily detached from the wire puller, when needed for other drill uses.

The wire puller is assembled and optimally positioned in close proximity to a junction box or other location, from which the line is to be pulled. Unlike the embodiment shown above, forearm portion 450 of wire puller 400 is supported by a stand 520 or a mounting bracket 600. Spool 460 or spool 630 in forearm frame portion 450 is preferably aligned with an opening of a conduit from which the line is being pulled to minimize friction in pulling the line out of the conduit by adjusting the position of base 490, pivoting wire puller 400 relative to base 490, and adjusting the length of forearm portion 450. Drive shaft end 432 is sized to be received within power drill jaws 328. Power drill 320 is positioned in drill restraint frame portion 440 to receive drive shaft end 432 and to allow drill switch lever 445 and drill switch actuator 447 to actuate power drill 320. Power drill chuck 326 couples power drill 320 to drive shaft end 432.

In operation, wire puller 400 operates in the same manner as wire puller 100 described above. More specifically, referring to FIG. 4, drill switch lever 445 and drill switch actuator 447 are in the "on" position, thus depressing power drill trigger switch 324 and actuating power drill 320. Actuating power drill 320 rotates drive shaft 430 and spool 410. The wire puller operator wraps line 310 around spool 410 for at least one revolution. The wire puller operator then holds line 310 taut to establish frictional coupling between spool 460 and line 310. As the wire puller pulls line 320 out of the junction box, the wire puller operator accepts the feed to maintain the frictional coupling of line 320 and spool 410. The wire puller operates to pull line while the power drill is actuated and the line is frictionally coupled to spool 410. To cease pulling line 310, the operator need only release the grip on line 310 to stop the frictional coupling between spool 410 and line 310. Thus, line pulling can start and stop without the need to rotate drill switch lever 445, after initial actuation of power drill 320.

Wire puller 400 is more advantageous than wire puller 100 if a larger force is required to pull the line. This is particularly true in light of transmission 422 for reducing the rotational speed and thereby increasing the torque of wire puller 400. Also, the support that is included in wire puller 400 increases the wire puller's ability to withstand larger forces. Wire puller 400 is not as compact as wire puller 100, but it is still extremely compact and light, especially when it is disassembled.

Wire puller 400 or wire puller 100 may include an additional spool adjacent to spool 460 or 160. In this configuration, line 310 will extend over spool 460 or 160 and under the additional adjacent spool so that the line forms an "S"-shaped pattern. This configuration is advantageous to keep line 310 aligned on the spools while it is being pulled from various directions, such as different heights or from the side of the spools. The additional adjacent spool is preferably mounted on the forearm portion adjacent to spool 460 or 160 on the side opposite from spool 420 or 120, respectively.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation.

What is claimed is:

1. An apparatus comprising:
    a frame having a drive shaft mounting portion and a power tool restraint portion, wherein the power tool restraint portion is adapted to register a portable rotary power tool with the frame;
    a drive shaft mounted with the frame in the drive shaft mounting portion, wherein the drive shaft may be rotated about its longitudinal axis and a first end of the drive shaft is sized to be coupled with a rotary output of the power tool;
    a frame switch having an "off" position and an "on" position mounted on the frame, the frame switch engaging a power switch on the power tool when the frame switch is moved from the "off" position to the "on" position and when such a tool is mounted in the restraint portion and coupled to the drive shaft; and
    a transmission mounted with the frame in the drive shaft mounting portion, the transmission comprising an input shaft and an output shaft coupled to the input shaft, the input shaft being coupled to the drive shaft, such that when the drive shaft rotates the input shaft at a first speed, the output shaft rotates at a second speed that is different from the first speed.

2. The apparatus of claim 1, wherein the second speed is less than the first speed.

3. The apparatus of claim 1, wherein the power tool restraint portion comprises an open bracket.

4. The apparatus of claim 1, wherein the power tool is a power drill and the sole attachment of the power drill to the frame is made by tightening a chuck on the power drill such that the jaws of the power drill are coupled with the drive shaft.

5. The apparatus of claim 1, further comprising a stand attached to the frame.

6. The apparatus of claim 5, wherein the frame further comprises:
    a forearm portion; and
    a second spool mounted on the forearm portion.

7. The apparatus of claim 6, wherein the stand is attached to the frame, such that the frame can pivot to adjust the height of the second spool.

8. The apparatus of claim 7, further including a detachable support attached to the forearm portion, the support preventing pivotal movement of the frame and thereby fixing the second spool at a height.

9. The apparatus of claim 6, further comprising a first spool coupled to the drive shaft.

10. An apparatus comprising:
    a frame having a drive shaft mounting portion and a power tool restraint portion, wherein the power tool restraint portion is adapted to register a portable rotary power tool with the frame;
    a drive shaft mounted with the frame in the drive shaft mounting portion, wherein the drive shaft may be rotated about its longitudinal axis and a first end of the drive shaft is sized to be coupled with a rotary output of the power tool;
    a frame switch having an "off" position and an "on" position mounted on the frame, the frame switch engaging a power switch on the power tool when the frame switch is moved from the "off" position to the "on" position and when such a tool is mounted in the restraint portion and coupled to the drive shaft;
    a first spool coupled to the drive shaft; and
    a forearm portion, a second spool mounted on the forearm portion, wherein the forearm portion is adjustable so that a distance from the first spool to the second spool is adjustable.

11. An apparatus comprising:
    a frame having a drive shaft mounting portion and a power drill restraint portion, wherein the power drill restraint portion is adapted to register a power drill with the frame;

a drive shaft mounted with the frame in the drive shaft mounting portion, wherein the drive shaft may be rotated about its longitudinal axis and a first end of the drive shaft is sized to be coupled with the jaws of a power drill; and a switch lever having an "off" position and an "on" position mounted in the power drill restraint portion, the switch lever being continuously retained in the "on" position to depress a trigger switch on a power drill when the switch lever is moved from the "off" position to the "on" position and when such a drill is mounted in the restraint portion and coupled to the drive shaft; and a transmission mounted with the frame, the transmission comprising an input shaft and an output shaft coupled to the input shaft, the input shaft being coupled to the drive shaft, such that when the drive shaft rotates the input shaft at a first speed, the output shaft rotates at a second speed that is different than the first speed.

12. The apparatus of claim 11, wherein the second speed is less than the first speed.

13. The apparatus of claim 11, wherein the power drill restraint portion comprises an open bracket and the sole attachment of the power drill to the frame is made by tightening a chuck on the power drill, such that the jaws of the power drill are coupled with the drive shaft.

14. The apparatus of claim 11, further comprising a first spool mounted on the output shaft.

15. The apparatus of claim 14, wherein the frame further comprises:

a stand attached to the frame;

a forearm portion; and a second spool mounted on the forearm portion.

16. The apparatus of claim 15, wherein the stand is attached to the frame, such that the frame can pivot to adjust a height of the second spool.

17. The apparatus of claim 16, wherein the forearm portion is adjustable to adjust a distance between the first spool and the second spool.

18. The apparatus of claim 16, further including a detachable support attached to the forearm portion, the support preventing pivotal movement of the frame and thereby fixing the second spool at a height.

19. An apparatus comprising:

a frame having a drive shaft mounting portion, a power drill restraint portion, and a forearm portion, wherein the power drill restraint portion is adapted to register a power drill with the frame and with a switch lever;

a drive shaft mounted with the frame in the drive shaft mounting portion, wherein the drive shaft may be rotated about its longitudinal axis and a first end of the drive shaft is sized to be coupled with the jaws of a power drill, the switch lever depressing a trigger switch on the power drill when such a drill is mounted in the restraint portion and coupled to the drive shaft;

a transmission mounted with the frame, the transmission comprising an input shaft and an output shaft coupled to the input shaft, the input shaft being coupled to the drive shaft, such that when the drive shaft rotates the input shaft at a first speed, the output shaft rotates at a second speed that is less than the first speed;

a first spool mounted on the output shaft;

a second spool mounted on the forearm portion of the frame; and a stand attached to the frame, such that the frame can pivot to adjust a height of the forearm portion and the forearm portion is adjustable so that a distance between the first spool and the second spool is adjustable.

20. The apparatus of claim 19, further including a detachable support attached to the forearm portion, the support preventing pivotal movement of the frame and thereby fixing the second spool at a height.

21. The apparatus of claim 19, wherein the power drill restraint portion comprises an open bracket.

22. The apparatus of claim 19, wherein the sole attachment of a power drill to the frame is made by tightening a chuck on the power drill, such that the jaws of the power drill are coupled with the drive shaft.

* * * * *